(12) United States Patent
Watanabe

(10) Patent No.: US 7,895,758 B2
(45) Date of Patent: Mar. 1, 2011

(54) SHAPE MEASURING APPARATUS AND METHOD FOR EYEGLASS ELEMENT

(75) Inventor: Takahiro Watanabe, Itabashi-ku (JP)

(73) Assignee: Kabushiki Kaisha TOPCON, Itabashi-ku, Tokyo (JP)

( * ) Notice: Subject to any disclaimer, the term of this patent is extended or adjusted under 35 U.S.C. 154(b) by 35 days.

(21) Appl. No.: 12/465,686

(22) Filed: May 14, 2009

(65) Prior Publication Data

US 2009/0282688 A1 Nov. 19, 2009

(30) Foreign Application Priority Data

May 14, 2008 (JP) .................................. 2008-127656
Mar. 24, 2009 (JP) .................................. 2009-071194

(51) Int. Cl.
*G01B 5/20* (2006.01)
(52) U.S. Cl. ......................................................... 33/200
(58) Field of Classification Search ...................... 33/200
See application file for complete search history.

(56) References Cited

U.S. PATENT DOCUMENTS

| | | | |
|---|---|---|---|
| 5,121,550 A * | 6/1992 | Wood et al. ..................... | 33/551 |
| 6,728,656 B2 | 4/2004 | Suzuki | |
| 7,715,023 B2 * | 5/2010 | Yanagi et al. .................. | 356/614 |
| 7,721,452 B2 * | 5/2010 | Koyama .......................... | 33/200 |
| 2009/0241355 A1 * | 10/2009 | Watanabe ........................ | 33/200 |
| 2010/0077627 A1 * | 4/2010 | Iwai ................................ | 33/507 |
| 2010/0094589 A1 * | 4/2010 | Tesseraud ...................... | 702/167 |
| 2010/0134756 A1 * | 6/2010 | Divo et al. ..................... | 351/177 |

FOREIGN PATENT DOCUMENTS

| | | |
|---|---|---|
| JP | 2002-036084 A | 2/2002 |
| JP | 2002-098518 A | 4/2002 |

\* cited by examiner

*Primary Examiner* — Christopher W Fulton
(74) *Attorney, Agent, or Firm* — Buchanan Ingersoll & Rooney PC

(57) ABSTRACT

A shape measuring apparatus for eyeglass element is configured to three-dimensionally measure an inner circumferential contour shape of an eyeglass element. The apparatus includes a holder which holds the eyeglass element; a measuring element which traces a shape of the eyeglass element; a driver for the measuring element; a position detector which detects a position of the measuring element; an arithmetic controller which processes positional data on the measuring element and controls the driver to slide the measuring element, a moving amount detector which detects a moving amount of the measuring element per unit time when the measuring element moves towards the eyeglass element; and a movement controller which controls the measuring element to move at a desirable speed which corresponds to the moving amount per unit time detected by the moving amount detector.

12 Claims, 12 Drawing Sheets

SHAPE MEASURING APPARATUS AND METHOD FOR EYEGLASS ELEMENT

CROSS REFERENCE TO RELATED APPLICATIONS

The present application is based on and claims priority from Japanese Patent Application No. 2008-127656, filed on May 14, 2008 and No. 2009-71194, filed on Mar. 24, 2009, the disclosure of which is hereby incorporated by reference in its entirety.

BACKGROUND OF THE INVENTION

1. Field of the Invention

The present invention relates to shape measuring apparatus and method for eyeglass element, in particular, to the apparatus and method to measure shapes of a lens frame, a lens template, pattern, a demo lens and the like.

2. Description of the Related Art

In the prior art, a known shape measuring apparatus for eyeglass element traces the shape of a lens frame with a measuring element (contact element, feeler, stylus) by sliding the measuring element in a groove of an inner periphery of the lens frame. Japanese Unexamined Patent Application Publication No. 2002-36084 and No. 2002-98518 disclose such a shape measuring apparatus which aims not to deform easily deformable lens frames such as a thin lens frame or a half glass lens frame due to force from the measuring element at the time of measuring the shape the lens frames, by changing a rotation direction and speed of the measuring element.

Such a known shape measuring apparatus uses a DC motor or the like to drive the measuring element. However, there is a problem that the measuring element may hit a lens frame and damage it when getting in contact therewith since the speed of the moving measuring element is not controlled.

Another problem is that even when the DC motor is given a minimum amount of driving force to overcome friction of the moving measuring element for contacting the measuring element with the groove of the lens frame, the measuring element may move too fast, and hit the groove of the lens frame and bounce off from it.

For the purpose of preventing bouncing-off of the measuring element, the measuring element can be moved slowly. However, this may cause another problem that the measuring element stops moving halfway due to friction.

For measuring the shape of a lens template, the same problem that the measuring element hits the circumferential edge of the template and bounces off therefrom may occur.

SUMMARY OF THE INVENTION

An object of the present invention is to provide shape measuring apparatus and method for eyeglass element which can provide solution to the above-identified problems.

According to one aspect of the present invention, a shape measuring apparatus for eyeglass element comprises a holder which holds an eyeglass element; a measuring element which traces a shape of the eyeglass element; a driver which drives the measuring element; a position detector which detects a position of the measuring element; an arithmetic controller which acquires and processes positional data on the measuring element detected by the position detector, and controls the driver to slide the measuring element along a contour of the eyeglass element while the holder is holding the eyeglass element; a moving amount detector which detects a moving amount of the measuring element per unit time when the measuring element moves towards the eyeglass element; and a movement controller which controls the measuring element to move at a desirable moving speed, the moving speed being the moving amount per unit time detected by the moving amount detector, wherein the shape measuring apparatus for eyeglass element measures a contour shape of the eyeglass element by allowing the measuring element to trace a three-dimensional shape of the eyeglass element and acquiring the three-dimensional shape based on data on a drive state of the driver and positional data on the measuring element.

According to another aspect of the present invention, a shape measuring apparatus for eyeglass element comprises a holder which holds an eyeglass frame; a measuring element which traces grooves of two lens frames constituting the eyeglass frame; a driver which drives the measuring element; a position detector which detects a position of the measuring element; an arithmetic controller which acquires and processes positional data on the measuring element detected by the position detector, and controls the driver to slide the measuring element in the groove of each lens frame while the holder is holding the eyeglass frame; a moving amount detector which detects a moving amount of the measuring element per unit time when the measuring element moves towards a circumferential edge of the groove of each lens frame; and a movement controller which controls the measuring element to move at a desirable moving speed, the moving speed being the moving amount per unit time detected by the moving amount detector, wherein the shape measuring apparatus for eyeglass element measures an inner circumferential contour shape of each lens frame by allowing the measuring element to trace a three-dimensional shape of each lens frame and acquiring the three-dimensional shape based on data on a drive state of the driver and positional data on the measuring element.

In features of the above aspect, the movement controller controls the measuring element to decrease the moving speed when the moving speed is equal to or larger than a first predetermined value.

In the other features of the above aspect, the movement controller controls the measuring element to increase the moving speed when the moving speed is lower than a second predetermined value which is lower than the first predetermined value.

In the other features of the above aspect, when the moving amount detector detects that the measuring element has not moved over a predetermined length of time, the movement controller determines that the measuring element contacts with the eyeglass element and controls the measuring element to stop moving.

In the other features of the above aspect, the shape measuring apparatus for eyeglass element comprises a DC motor which moves the measuring element, wherein the movement controller controls the moving speed of the measuring element by controlling supply of an electric current to the DC motor.

According to another aspect of the present invention, a shape measuring method for eyeglass element comprising the steps of detecting a moving amount of a measuring element per unit time while the measuring element is moving towards an eyeglass element; and controlling the measuring element to move at a desirable moving speed, the moving speed being the moving amount detected.

In features of the above aspect, the shape measuring method for eyeglass element further comprises the step of controlling the measuring element to decrease the moving speed when the moving speed is equal to or larger than a first predetermined value.

In the features of the above aspect, the shape measuring method for eyeglass element further comprises the step of controlling the measuring element to increase the moving speed when the moving speed is lower than a second predetermined value which is lower than the first predetermined value.

In the other features of the above aspect, the shape measuring method for eyeglass element further comprises the step of determining that the measuring element contacts with the eyeglass element when the measuring element has not moved over a predetermined length of time and controlling the measuring element to stop moving.

In the other features of the above aspect, the shape measuring method for eyeglass element further comprises the step of controlling the movement of the measuring element by controlling supply of an electric current to a DC motor which moves the measuring element.

DETAILED DESCRIPTION OF THE PREFERRED EMBODIMENTS

First Embodiment

Figure 1:
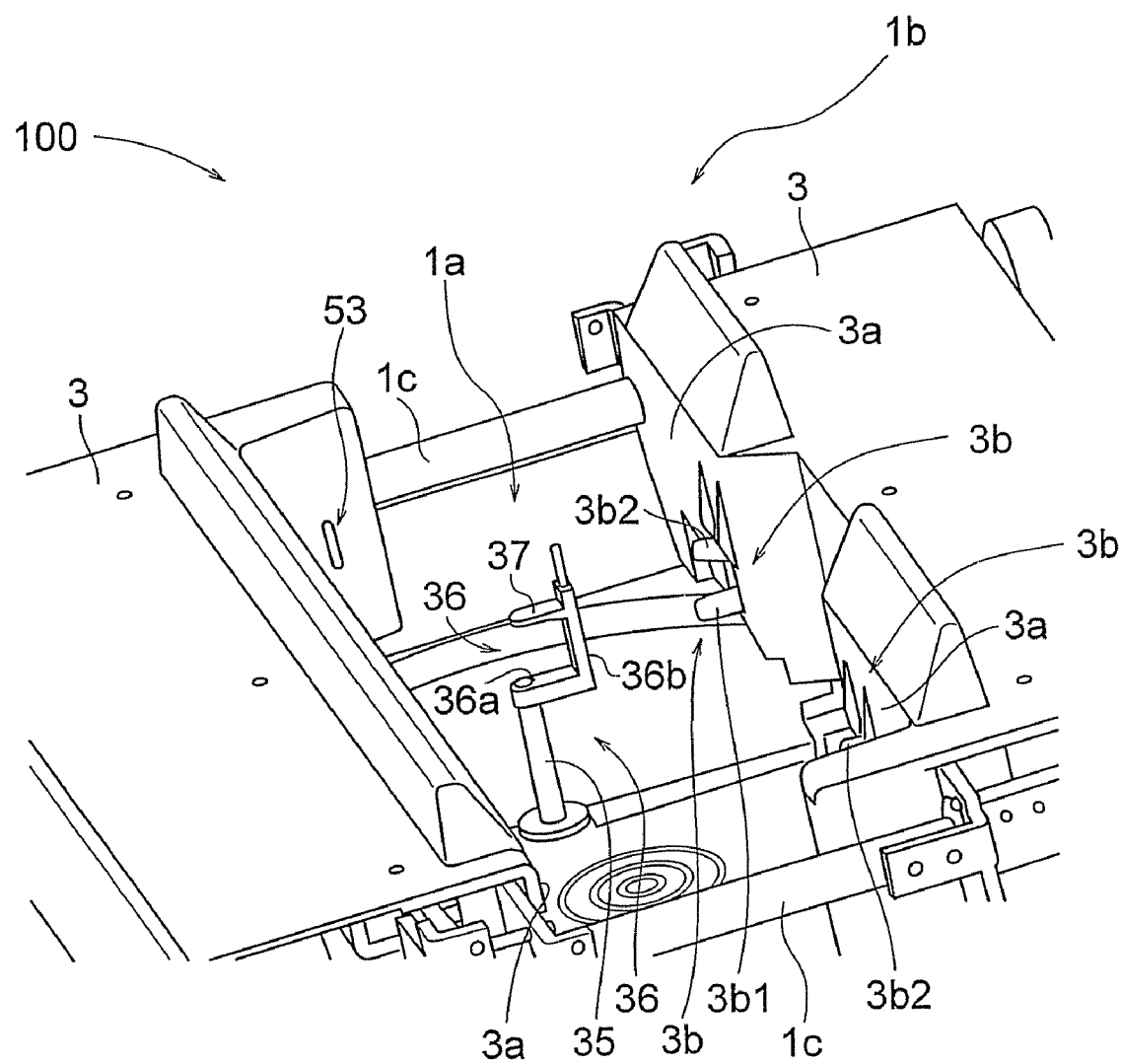
FIG. 1 is a schematic perspective view of a part of a shape measuring apparatus for eyeglass element according to one embodiment of the present invention.
Figure 2:
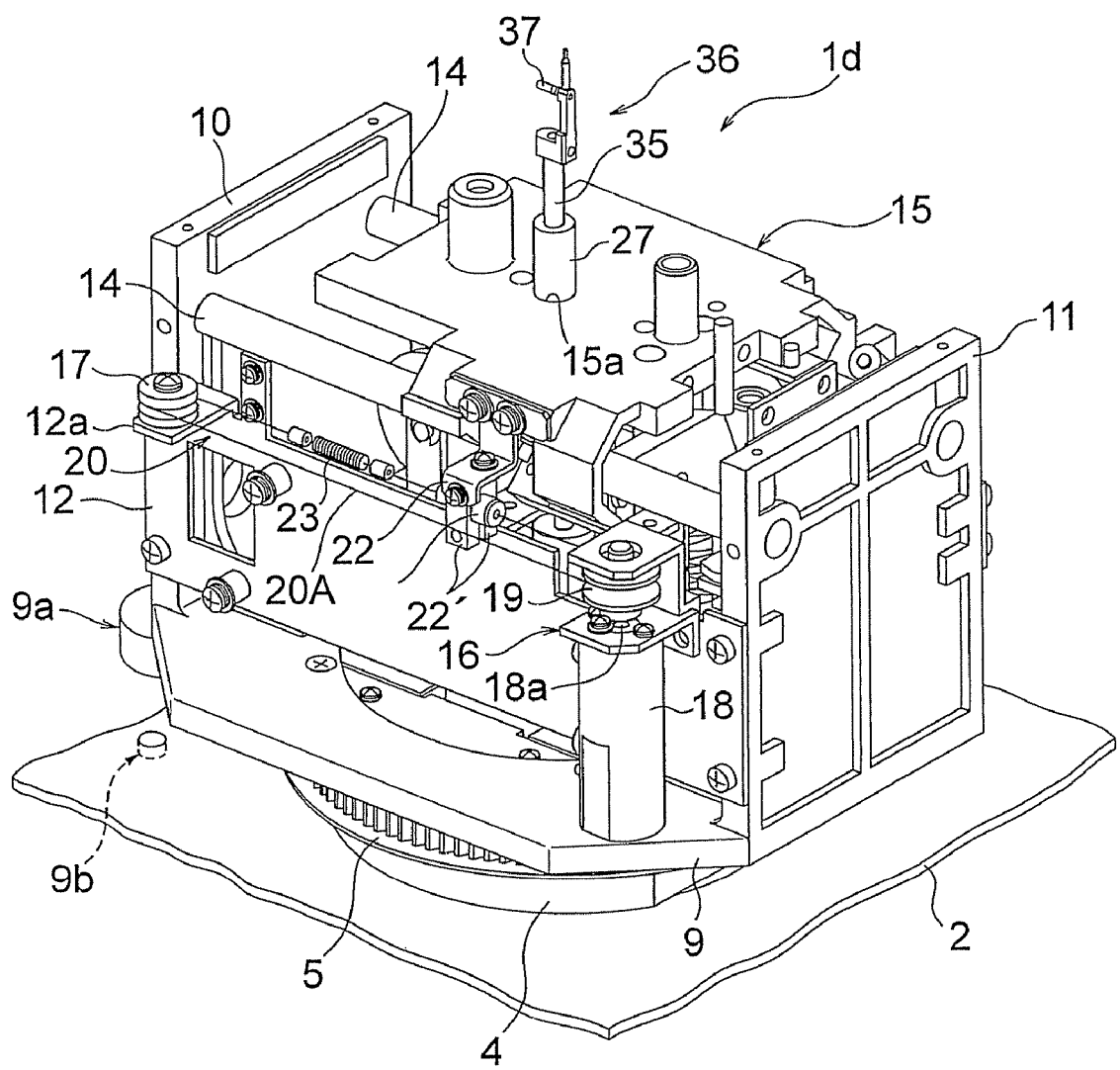
FIG. 2 is a perspective view of a measuring mechanism of the shape measuring apparatus for eyeglass element in FIG. 1.

First, the basic structure of a shape measuring apparatus for eyeglass element is described with reference to the drawings. FIG. 1 is a schematic perspective view of a top part of a shape measuring apparatus for eyeglass element 100 according to the present embodiment. The shape measuring apparatus 100 comprises a case 1a, an eyeglass frame holding mechanism 1b (holder), and a measuring mechanism 1d (FIG. 2). The eyeglass frame holding mechanism 1b is provided in an upper portion of the case 1a to hold an eyeglass frame to be measured.

FIG. 2 is a perspective view of the overall structure of the measuring mechanism 1d contained in the case 1a in FIG. 1. In the drawing, the measuring mechanism 1d comprises a base 2 to be placed on a floor, a mounting board or the like, a rotary base 9 rotating relative to the base 2, a slider 15 horizontally sliding relative to the rotary base 9, and a measuring element shaft 35 vertically movable relative to the slider 15. From the upper portion of the measuring element shaft 35, a lens frame measuring element 37 horizontally protrudes to trace grooves of inner circumferences of two lens frames constituting an eyeglass frame.

As shown in FIG. 1, the eyeglass frame holding mechanism 1b includes a pair of parallel guide rods 1c fixed to the upper portion of the case 11. A pair of slide frames 3 are provided on the guide rods 1c to be able to approach or move away from each other.

In the vicinity of the slide frames 3, vertical walls 3a extend vertically, respectively, and on an opposite side thereof, two pairs of eyeglass frame holders 3b to hold a not-shown eyeglass frame are provided.

The eyeglass frame holders 3b include a pair of holding bars 3b1, 3b2 which are vertically disposed. The holding bar 3b1 is fixed to protrude from the vertical wall 3a while the holding bar 3b2 protrudes from the vertical wall 3a and is vertically slidable. The holding bars 3b1, 3b2 work for holding the eyeglass frame therebetween. The four eyeglass frame holders 3b are provided for each of right and left lens frames constituting the eyeglass frame. Further, the slide frames are continuously biased by a not-shown coil spring or the like to approach each other so that the eyeglass frame is held vertically by the frame holder 3b and sandwiched vertically by the slide frames 3 while the eyeglass frame is mounted on the eyeglass frame holding mechanism 1b. Note that such a eyeglass frame holding mechanism 1b can be realized by one disclosed in Japanese Unexamined Patent Application Publication No. 10-328992 for example or other known techniques. Therefore, a detailed description on the eyeglass frame holding mechanism 1b is omitted.

Figure 3:
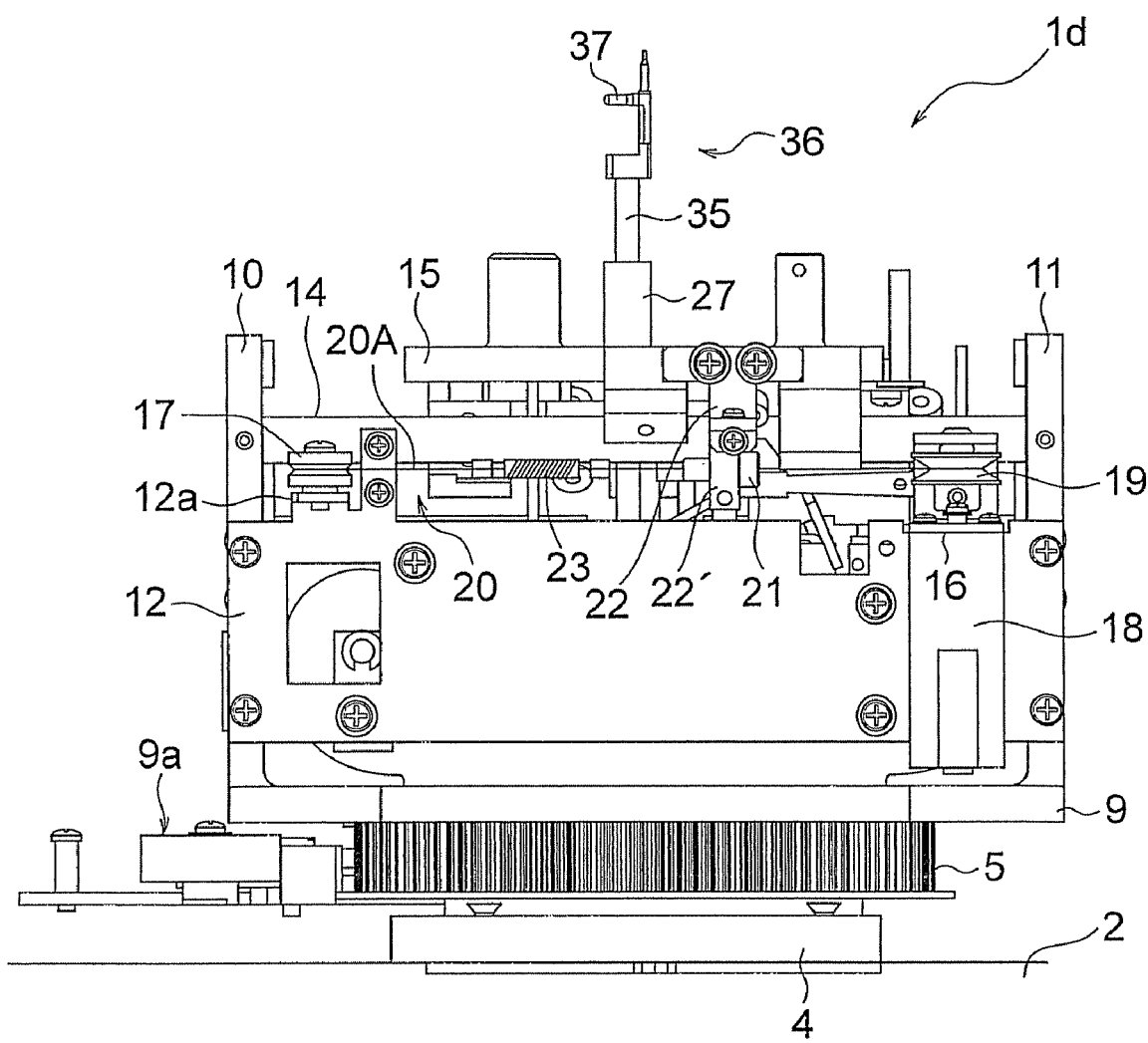
FIG. 3 is a front view of the measuring mechanism in FIG. 2.
Figure 4:
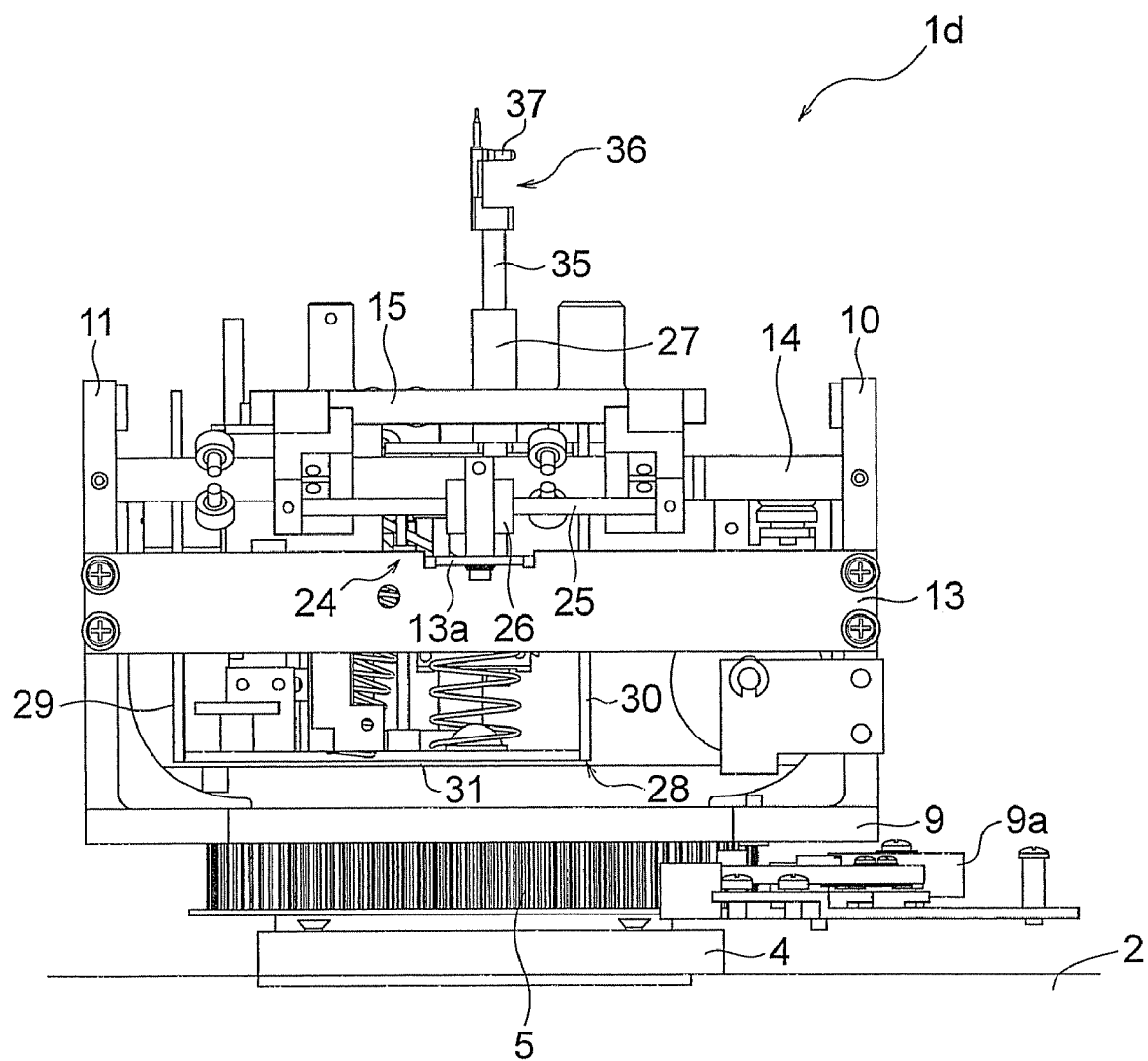
FIG. 4 is a back view of the measuring mechanism in FIG. 2.
Figure 5:
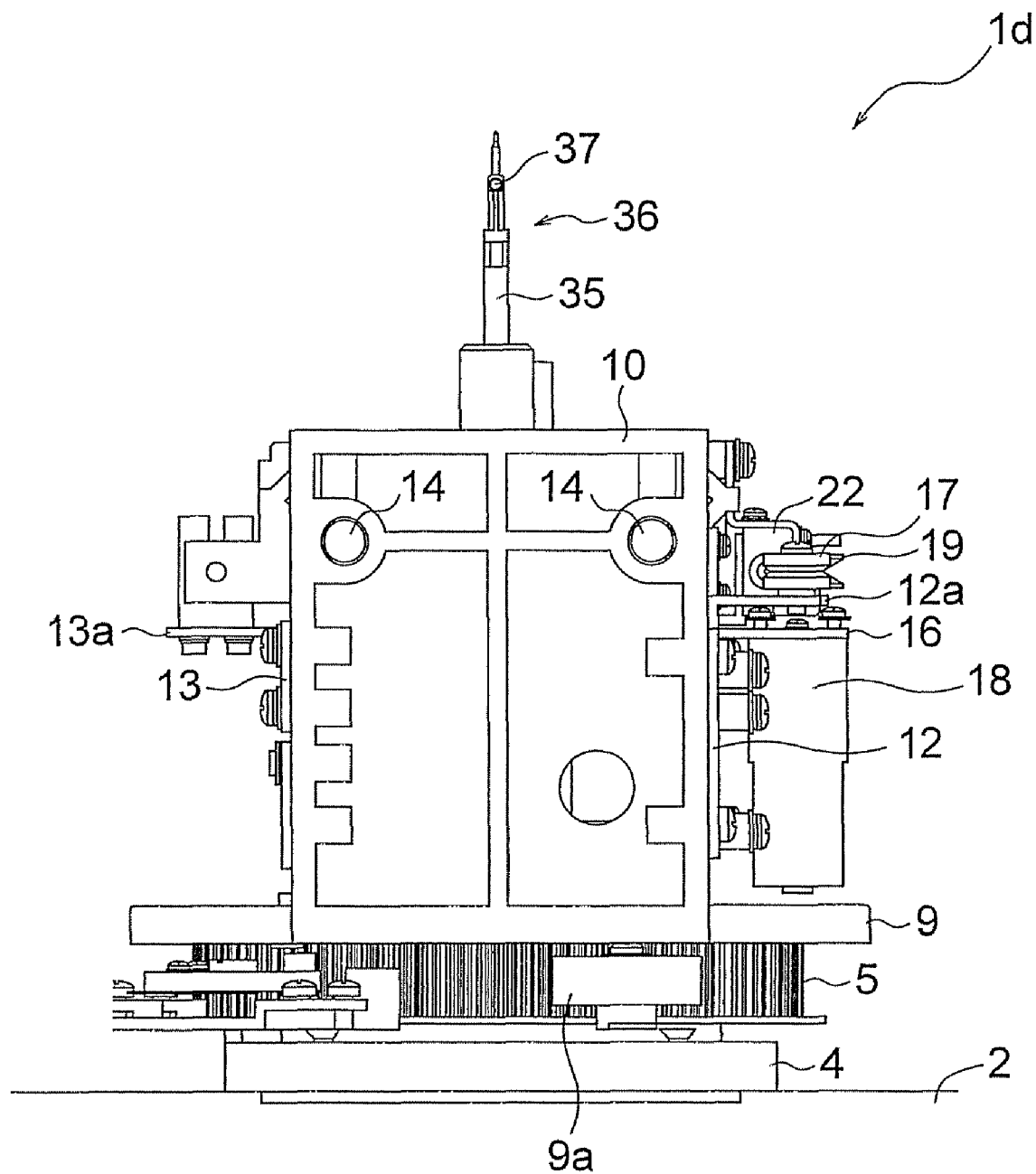
FIG. 5 is a right side view of the measuring mechanism in FIG. 2.

FIGS. 3 to 5 is front, back, and left side views of the measuring mechanism 1d in FIG. 2, respectively. As shown in FIGS. 2 to 5, the measuring mechanism 1d includes a rotary base support member 4 which is fixed on the base 2 and includes a not-shown rotary shaft vertically extending (rotating around an axis C in FIG. 6). A gear 5 of a large diameter is rotatably mounted on the rotary shaft. A rotary base 9 is fixed on the gear 5 so that the rotary base 9 is rotatable relative to the base 2 along with the rotation of the gear 5.

Figure 6:
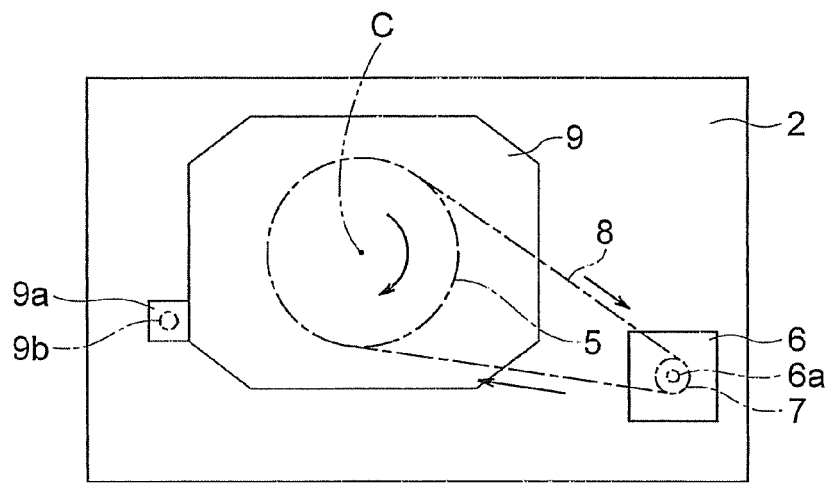
FIG. 6 schematically shows a driver for a rotary base of the measuring mechanism in FIG. 2.

FIG. 6 is a schematic top view of a rotary mechanism for the rotary base 9. As shown in the drawing, a motor (driver for measuring element) 6 is fixed on the base 2 so that its rotation shaft 6a faces vertically upward. The rotation shaft 6a includes a pinion 7 and a belt 8 is extended between the pinion 7 and the gear 5.

Upon driving the motor 6, rotation of the rotation shaft 6a is transmitted to the gear 5 via the belt 8 to rotate the gear 5. The motor 6 is a 2-phase stepping motor, for example.

In FIG. 2, the shape measuring apparatus for eyeglass element according to the present embodiment includes a rotary reference position detector which detects a reference position of the rotation of the rotary base 9 relative to the base 2 and comprises a light-emitting marker 9b for indicating a reference position and a photosensor 9a. The light-emitting marker 9b is provided on the base 2 and the photosensor 9a is provided on the rotary base 9. The light-emitting marker 9b emits light upward through a slit or a circular hole formed in the base 2. The photosensor 9a on the rotary base 9 detects the light to detect the reference position of the rotation of the rotary base 9.

The rotary reference position detector can be realized by a well-known sensor such as a transmissive photosensor, a reflective photosensor, or a proximity sensor or the like.

The rotary base 9 is integrally formed with rail plates 10, 11 at its both ends, respectively. The rail plates 10, 11 extend upward from the respective ends and face each other in parallel. As shown in FIG. 3, both longitudinal ends of a substantially rectangular side plate 12 are fixed to one side of the rail plate 10 and one side of the rail plate 11 while in FIG. 4, both longitudinal ends of a side plate 13 are fixed to the other side of the rail plate 10 and the other side of the rail plate 11.

As shown in FIG. 2, a pair of bar-like guide rails 14 horizontally extend between the upper portions of the rail plates 10, 11 and are parallel to each other. They are fixed at their both ends to the rail plates 10, 11. The slider 15 is slidably fitted into the guide rails 14.

Moreover, in FIGS. 2 and 3, a pulley support plate 12a is integrally formed with the side plate 12 on a rail plate 10 side and a bracket 16 for mounting a motor is integrally formed with the side plate 12 on a rail plate 11 side.

In the pulley support plate 12a, a pulley 17 is mounted rotatably on a rotary shaft which vertically extends. The top end of a motor 18 (driver, DC motor) for the slider is fixed to the bottom of the bracket 16. A rotary shaft 18a of the motor 18 extends upward and has a pulley 19 attached thereto as shown in FIGS. 2, 3. The motor 18 is a DC motor.

Figure 7:
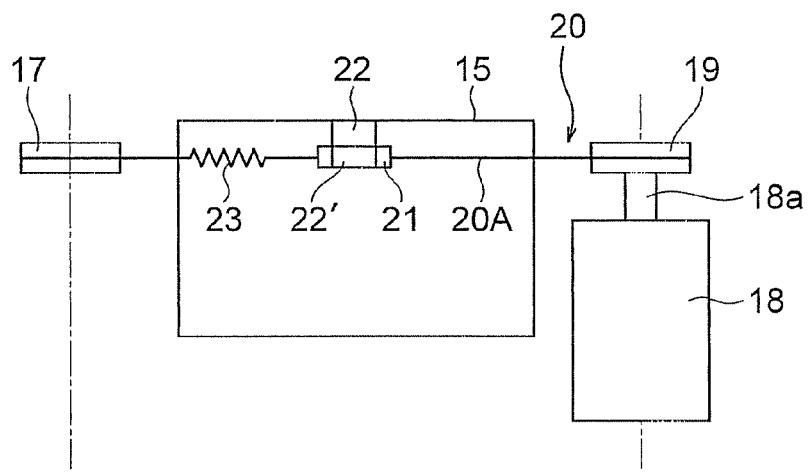
FIG. 7 schematically shows a drive mechanism for a slider in FIG. 2.
Figure 8:
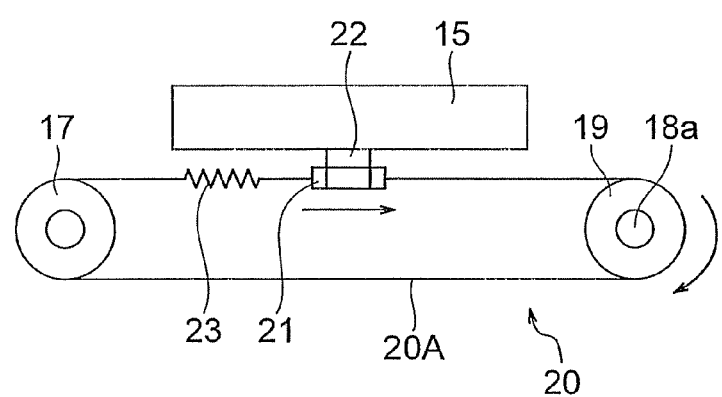
FIG. 8 is a top view of the drive mechanism in FIG. 7.

FIG. 7 schematically shows a drive mechanism for the slider 15 in FIG. 2. FIG. 8 is a top view thereof in FIG. 7. As shown in FIGS. 2, 3, 7, and 8, a wire belt 20 is wound on the pulleys 17, 19. The wire belt 20 comprises a wire 20A, a coil spring 23 to give tension to the wire 20A, and a cylindrical wire holding member 21 to hold the wire 20A with brackets 22, 22' fixed to the slider 15. The wire holding member 21 has an opening into which the wire 20A is inserted and they are fixed to each other. Both ends of the wire 20A are connected by the coil spring 23 to form a ring-like wire belt 20. The wire belt 20 is fixed to the slider 15 by holding the wire holding member 21 between the brackets 22, 22' of the slider 15. With such a configuration, normal or reverse rotation of the motor 18 normally or reversely rotates the rotary shaft 18a and the pulley 19, thereby moving the slider 15 left or right as shown in FIG. 3.

Figure 9:
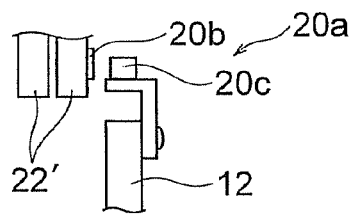
FIG. 9 schematically shows a detector for the original position of the slider in FIG. 2.

FIG. 9 shows a detector for the original position of the slider in FIG. 2. As shown in FIG. 9, the shape measuring apparatus for eyeglass element according to the present embodiment comprises a slide reference position detector 20a to detect a reference position of the slider 15 relative to the rotary base 9. The slide reference position detector 20a comprises a reflection plate 20b with a reflection surface which extends vertically (not shown) and a reflective photosensor 20c integrally including a light-emitting element and a light-receiving element. The reflection plate 20b is provided in the bracket 22' while the reflective photosensor 20c is provided in the side plate 12.

The slide reference position detector 20a can be realized by a known sensor such as a transmissive photosensor or a proximity photosensor.

As shown in FIG. 4, a linear scale 24 (position detector) is interposed between the side plate 13 and the slider 15 to detect a radial coordinate (a distance from rotation center C in radial direction). The linear scale 24 has a lengthy main scale 25, and a positional data detector head 26 which moves along the main scale 25 to read positional data stored in the main scale 25. The main scale 25 is fixed on the slider 15 in parallel to the guide rail 14, and the detector head 26 is fixed on a support plate 13a which is integrally formed with the side plate 13.

The detector head 26 detects moving position of the slider 15 in the horizontal direction from the positional data stored in the main scale 25. Well-known magnetic type and optical type linear scales can be used for the linear scale 24, for example.

For example, in a magnetic type linear scale 24, the main scale 25 has a magnetic pattern where magnetic poles S, N are alternately placed in its longitudinal direction at minute intervals. By detecting the magnetic pattern with the detector head 26a, such a linear scale 24 is configured to detect a moving position of the slider 15 according to a signal outputted from the detector head 26.

In an optical type linear scale 24, a plate-like main scale 25 includes a number of slits in its longitudinal direction at minute intervals. A detector head 26 is provided with a light-emitting element and a light-receiving element which sandwich the main scale 25 from both sides. Such an optical type linear scale 24 is configured to detect light emitted from the light-emitting element with the light-receiving element via the slits of the main scale 25, count the number of slits, and thereby detect the moving position of the slider 15.

The slider 15 includes, at a substantial center thereof, a through-hole 15a through which a tubular guide 27 which extends vertically is inserted, as shown in FIG. 2. Below the slider 15, a support frame 28 is disposed as shown in FIG. 4. The support frame 28 has a bottom plate 31, and longitudinal frames 29, 30 which are parallel to each other and extend upward from both ends of the bottom plate 31, and upper ends of the longitudinal frames 29, 30 are fixed on the slider 15.

Figure 10:
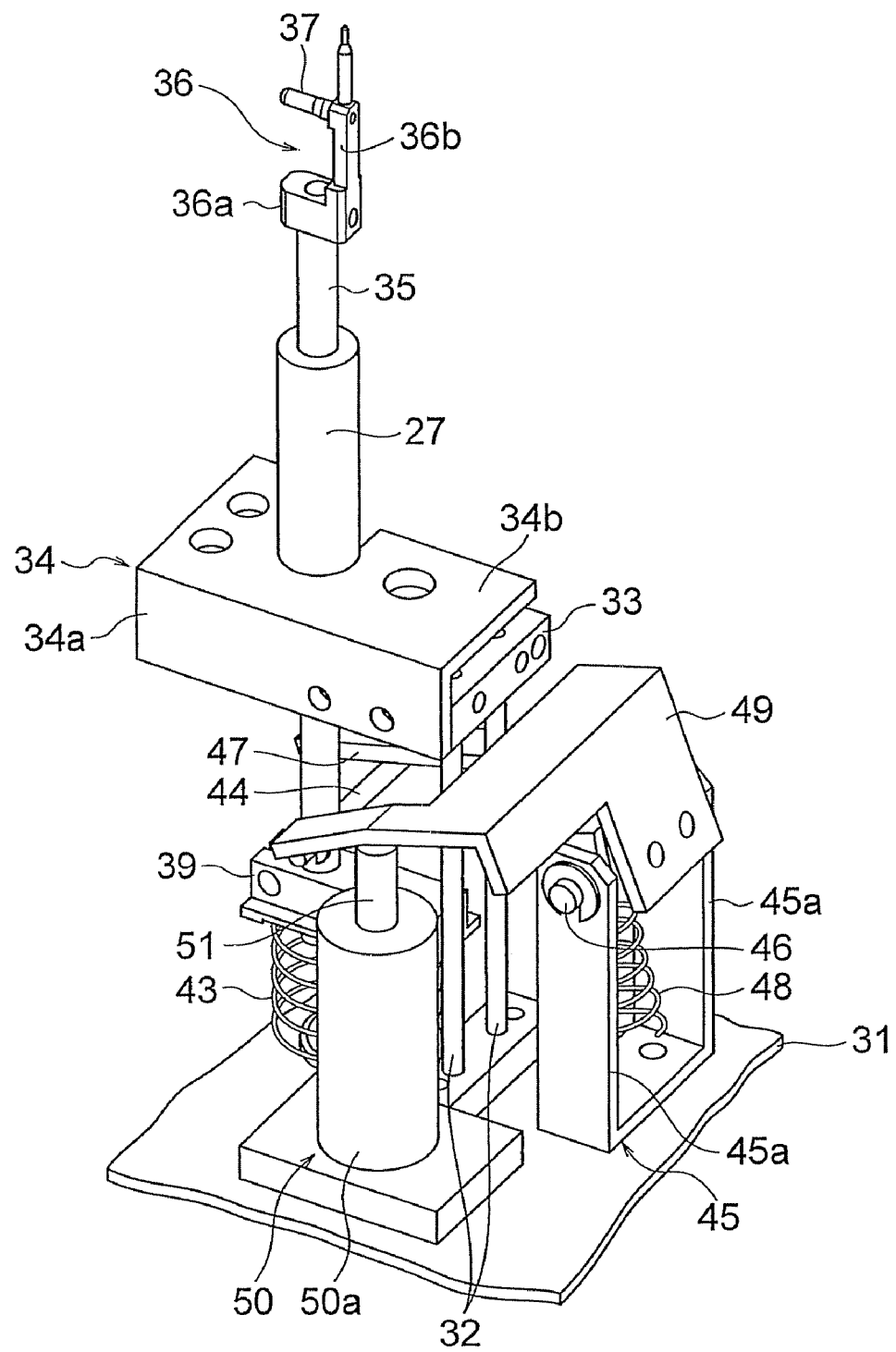
FIG. 10 is a perspective view of an elevation mechanism for a contact element in FIG. 2.

FIG. 10 is a perspective view of an elevation mechanism of the measuring element 36. As shown in FIG. 10, a pair of cylindrical support members 32 which extend upward and are parallel to each other are fixed on the bottom plate 31 of the support frame 28 in FIG. 4. On upper ends of the support members 32, a connecting member 33 is fixed. A vertical plate 34a of a guide support member 34 with an L-shape side surface is fixed on the connecting member 33. A lower end of the tubular guide 27 is fixed on a horizontal plate 34b of the guide support member 34.

A measuring element shaft 35 which extends vertically (long) is vertically movably inserted and fitted into the tubular guide 27, and is integrated with a measuring element 36 at an upper end. In FIG. 10, the measuring element 36 has an upright portion 36b which extends vertically (long), and a lens frame measuring element 37 which is fixed on the upper end of the upright portion 36b and extends in a horizontal direction. A connecting member 36a connects a lower end of the measuring element 36 and an upper end of the measuring element shaft 35. The connected measuring element shaft 35, connecting member 36a, and measuring element 36 are formed in an almost crank-shape. The upright portion 36b of the measuring element 36 is used for measuring a counter shape of a lens template, pattern, a demo lens and the like.

Figure 11:
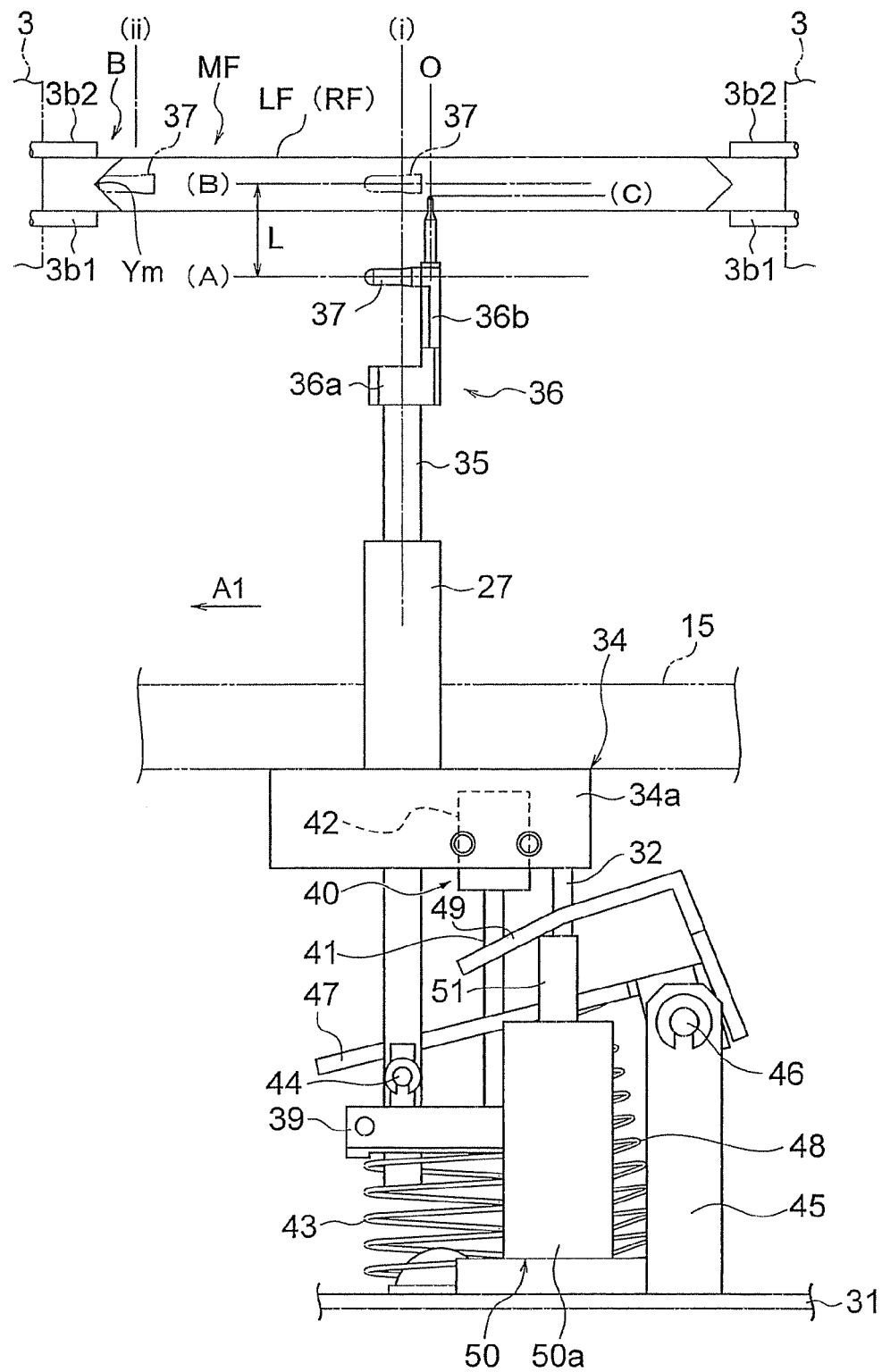
FIG. 11 shows the elevation mechanism in FIG. 10 measuring an eyeglass frame.
Figure 12:
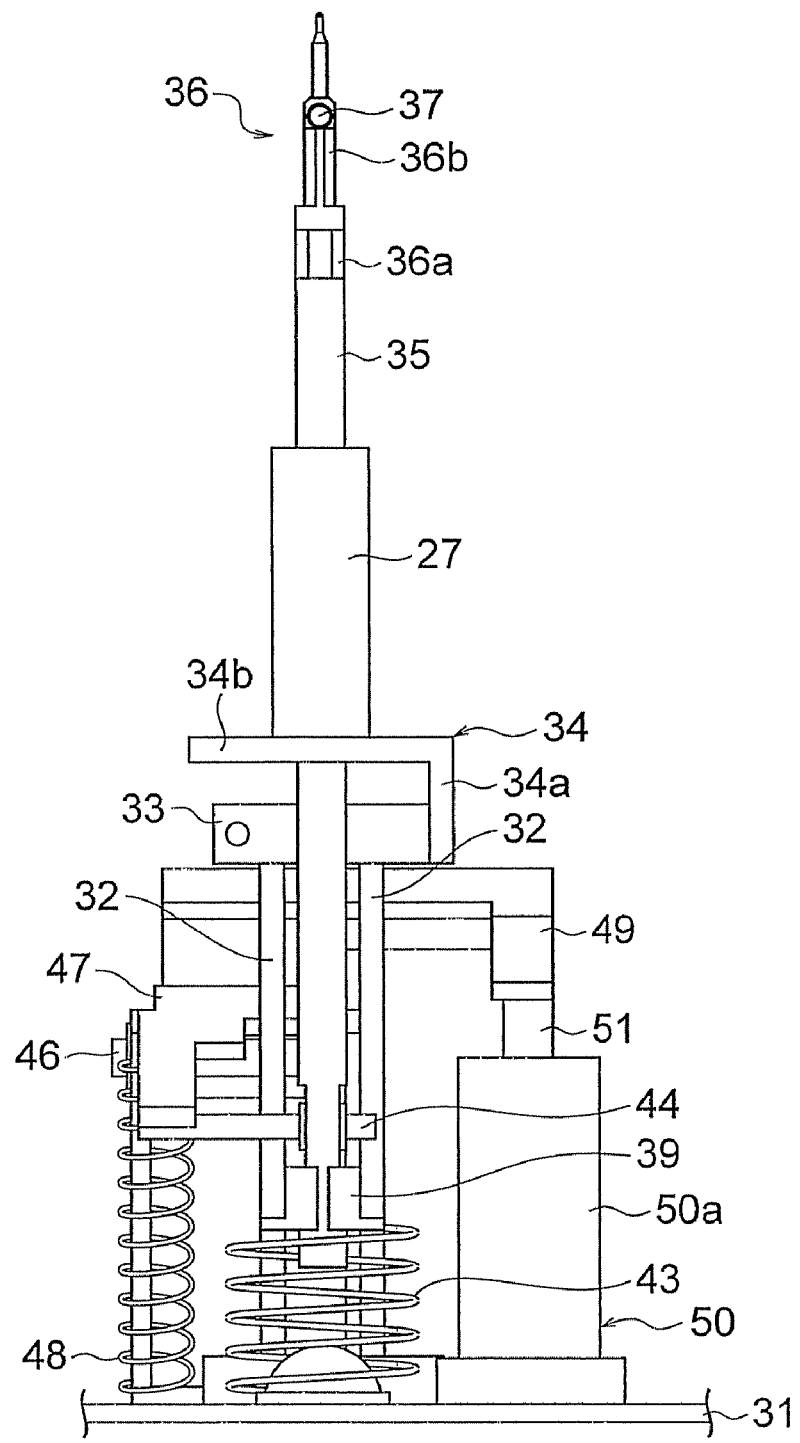
FIG. 12 is a left side view of the elevation mechanism in FIG. 11.

FIG. 11 shows measuring an eyeglass frame by the elevation mechanism of the measuring element 36 in FIG. 10. FIG. 12 is a left side view of FIG. 11. As shown in FIGS. 10 to 12, a bracket 39 is provided below the measuring element shaft 35 and is fixed in a lower end of the measuring element shaft 35. In FIG. 11, a linear scale 40 (position detector) for detecting a height of the measuring element 36 is interposed between the bracket 39 and the guide support member 34.

The linear scale 40 has a stick-like main scale 41, and a positional data detector head 42 which moves along the main scale 41 to read positional data on the main scale 41. The positional data detector head 42 is fixed to the connecting member 33 in FIG. 10, and the main scale 41 is fixed to the bracket 39 at a lower end in parallel to the measuring element shaft 35 in a vertical direction. An upper end of the main scale 41 is not fixed and inserted into holes of the connecting member 33, and the bottom plate 34b of the guide supporting member 34 is vertically movable.

The linear scale 40 detects a vertical moving amount of the measuring element 36 fixed to the main scale 41 via the bracket 39 by detecting a vertical moving amount of the main scale 41 with the positional data detector head 42. The linear scale 40 is of magnetic type or optical type the same as linear scale 24 described above.

In addition, as shown in FIGS. 10 to 12, a coil spring 43 is interposed between the bracket 39 and the bottom plate 31 to constantly bias the measuring element shaft 35 upward. In the vicinity of a joining part of the measuring element shaft 35 with the bracket 39, an engaging pin 44 is inserted perpendicularly into the measuring element shaft 35.

In FIG. 10, a U-shape bracket 45 is fixed on the bottom plate 31, and includes opposed plates 45a. Both ends of a support shaft 46 are rotatably held on upper portions of the opposed plates 45a. A pressing lever 47 and an elevation position regulating lever 49 are fixed to this support shaft 46, and they extend in the same direction as the support shaft 46. Therefore, the pressing lever 47 and the elevation position regulating lever 49 are rotatable from the bracket 45 on the bottom plate 31 with the support shaft 46 as a rotational axis.

Moreover, a coil spring 48 is interposed between the pressing lever 47 and the bottom plate 31 to constantly give tension to press down the pressing lever 47, since the coil spring 48 is set to have an elastic force in a compressing direction larger than that of the coil spring 43 in an extending direction. The pressing lever 47 abuts on an upper portion of the engaging pin 44 from above, to regulate an elevation of the measuring element shaft 35 by the coil spring 43.

Below the elevation position regulating lever 49, a linear actuator 50 (driver) is provided. The linear actuator 50 comprises a motor 50a for an actuator body fixed on the bottom plate 31 and a shaft 51 which protrudes upward from the motor 50a and is parallel to the measuring element shaft 35.

The linear actuator 50 is a DC motor or the like. The shaft 51 of the linear actuator 50 is normally rotated to move upward while it is reversely rotated to move downward. The motor 50a can be driven under the control of an arithmetic control circuit 52 which is described later. Since the upper end of the vertically movable shaft 51 of the linear actuator 50 abuts with the elevation position regulating lever 49 from below, the elevation of the shaft 51 elevates the pressing lever 47, to thereby release regulation of the vertical movement of the pressing lever 47 to the measuring element shaft 35. Thus, the coil spring 43, the support shaft 46, the pressing lever 47, the coil spring 48, the elevation position regulating lever 49, the linear actuator 50 and the like constitute the elevation mechanism for the measuring element 36.

Figure 13:
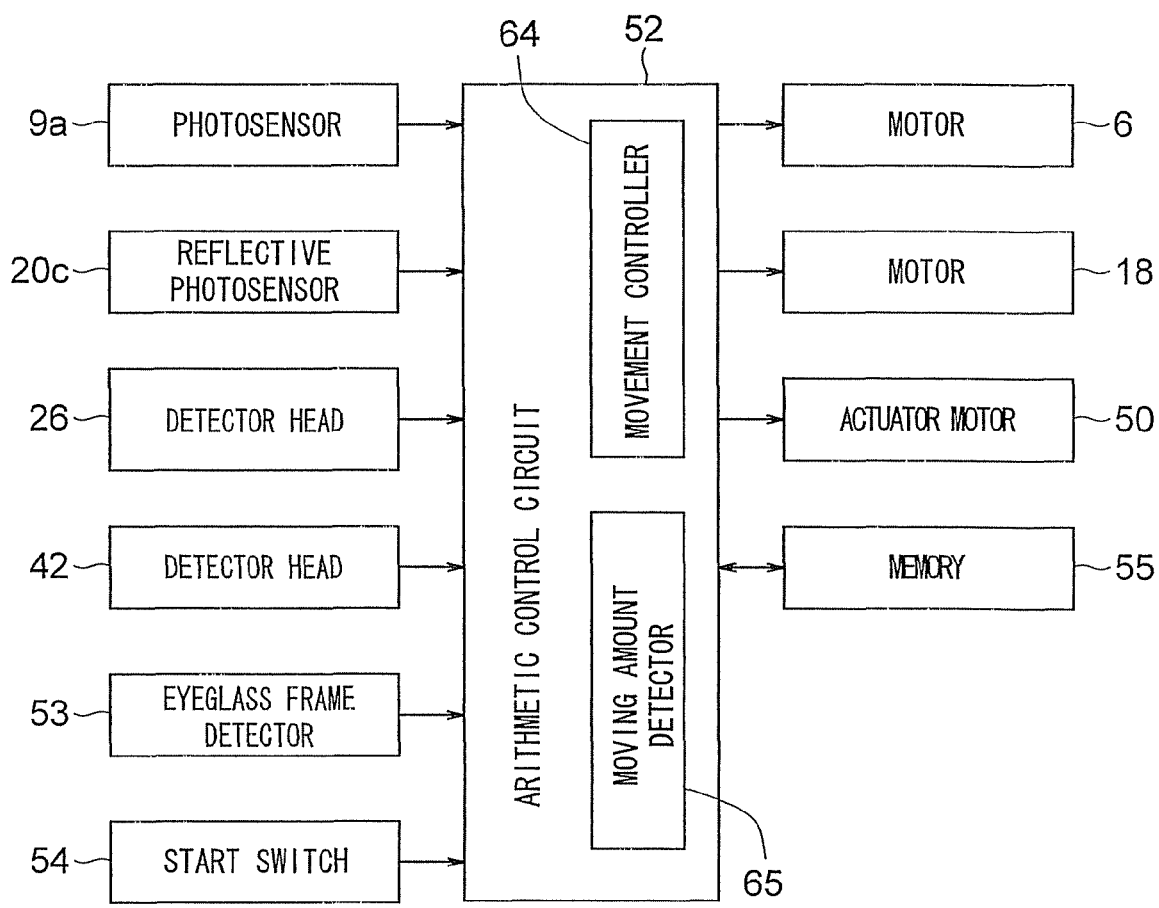
FIG. 13 is a block diagram of a control system of the shape measuring apparatus for eyeglass element in FIG. 1.

FIG. 13 shows a control system for the shape measuring apparatus for eyeglass element 100. FIG. 13 shows an arithmetic control circuit 52 (arithmetic controller). The arithmetic control circuit 52 is configured to receive a detect signal indicating a rotary reference position from the photosensor 9a, a detect signal indicating a slide reference position from the reflective photosensor 20c, a detect signal indicating a radius coordinate from the positional data detector head 26 of the linear scale 24, a detect signal indicating a height of the measuring element from the positional data detector head 42 of the linear scale 40 and else. Also, the arithmetic control circuit 52 controls the driving of the motors 6, 18 and the linear actuator 50.

An eyeglass frame detector 53 is a micro switch or the like provided on one side plate of one of the slide frames 3 to determine whether or not an eyeglass frame is mounted on the slide frames 3 (FIG. 1). The eyeglass frame detector 53 outputs detect signals indicating the mounting of the eyeglass frame to the arithmetic control circuit 52, as shown in FIG. 13. A start switch 54 to start the measurement and a memory 55 are connected with the arithmetic control circuit 52 in FIG. 13.

Before the shape measuring apparatus for eyeglass element 100 starts measuring the shape of a lens frame of an eyeglass frame, the shaft 51 of the linear actuator 50 is placed at the lowest position so that the measuring element shaft 35 is pressed down by the pressing lever 47, as shown in FIG. 11. Accordingly, the measuring element is at the lowest position before start of the measurement of the apparatus 100.

As in FIG. 11, for measuring the shape of an eyeglass frame, left and right lens frames LF (RF) (eyeglass element) of an eyeglass frame MF (not shown in FIG. 1) are supported between the slide frames 3 in FIG. 1 and held by four pairs of holding bars 3b1, 3b2 in the same manner as that disclosed in Japanese Unexamined Patent Application Publication No. 10-328992, for example.

Before start of the measurement, the left and right lens frames LF (RF) held by the holding bars 3b1, 3b2 are set to be positioned above the lens frame measuring element 37. That is, the lens frame measuring element 37 is positioned at an initial height (A) which is below the lens frame LF (RF). The measuring element 36 is at an initial position (i) which is set to about the center of one of lens frames LF, RF seen from the front. Before the measurement, the above-described rotary reference position detector detects the rotary reference position of the rotary base 9, and at the same time the linear scale 24 detects the slide reference position of the slider 15.

Note that the holding bar 3b1, 3b2 can hold a lowest position of the lens frame even when the lens frame is curved. The shape measuring apparatus for eyeglass element according to the present embodiment is configured to start measuring the position from the groove Ym being at the lowest position of the lens frame LF (RF) held by the lens frame holder 3b. The position at which the measuring starts is referred to as a measurement start position B.

At turning-on of the start switch 54 while the measuring element 36 is at the initial position (i), the arithmetic control circuit 52 normally rotates the shaft 51 of the linear actuator 50 to elevate it by a predetermined distance from the position in FIG. 11. At this point, the shaft 51 presses up the free end of the elevation position regulating lever 49 by a predetermined distance against the elastic force of the coil spring 48 to integrally rotate the elevation position regulating lever 49 and the support shaft 46.

The pressing lever 47 is also rotated integrally with the support shaft 46 and the free end thereof elevates by a predetermined distance, which causes the engaging pin 44 to follow the movement of the free end of the pressing lever 47 and elevate due to the elastic force of the coil spring 43, thereby elevating the measuring element 36 by a predetermined distance.

The predetermined distance of the elevating measuring element 36 is set to a distance L in FIG. 11 in which the tip of the lens frame measuring element 37 elevates from the initial position (A) to a height (B) of the measurement start position B.

Then, the arithmetic control circuit 52 drives the motor 18 to rotate the pulley 19, so that the slider 15 is moved along the guide rail 14 by the wire belt 20 in FIG. 7. The slider 15 is moved in a direction of the arrow Al in FIG. 11, which makes the tip of the lens frame measuring element 37 contact with the groove Ym at the measurement start position B. In this state the arithmetic control circuit 52 stops the driving of the motor 18. Also, the tip of the lens frame measuring element 37 is constantly pressed onto the groove Ym by the elastic force of the coil spring 23 while it traces the groove Ym.

Note that when the tip of the lens frame measuring element is brought in contact with the groove Ym, an increase in a load on the motor 18 increases the amount of current flowing into the motor 18. The arithmetic control circuit 52 can stop the motor by detecting the tip of the lens frame measuring element 37 in contact with the groove Ym from a change in the amount of current. The shape measuring apparatus for eyeglass element 100 according to the present embodiment is configured to control the motor 18 in a manner later-described.

Then, the arithmetic control circuit 52 normally rotates the shaft 51 of the linear actuator 50 and elevates the shaft 51 by a predetermined distance. In this case, the shaft 51 lifts up the free end of the elevation position regulating lever 49 by a predetermined distance against the elastic force of the coil spring 48, and rotates the elevation position regulating lever 49 together with the support shaft 46.

Along with the elevation position regulating lever 49, the pressing lever 47 is also rotated together with the support shaft 46, to elevate the free end by a predetermined distance. The elevation of the free end of the pressing lever 47 moves the pressing lever 47 away from the engaging pin 44 by a predetermined distance, which makes the measuring element shaft 35 vertically movable along with the tip of the lens frame measuring element 37 tracing along the groove Ym.

Next, the arithmetic control circuit 52 controls the motor 6 to normally rotate the rotary shaft 6a of the motor 6. The normal rotation of the rotary shaft 6a is transmitted to the gear 5 via the pinion 7 and the belt 8, so that the rotating base 9 integrated with the gear 5 rotates around a rotary shaft (axis C) of the gear 5 (see FIG. 6).

An upper portion of the measuring mechanism 1d is rotated while the arithmetic control circuit 52 controls the slider 15 to allow the tip of the lens frame measuring element 37 to constantly press down the groove Ym. Then, the tip of the lens frame measuring element 37 is moved vertically along the groove Ym to trace the groove Ym.

In this case, the slider 15 is moved integrally with the lens frame measuring element 37 along the guide rail 14, so that the moving amount of the slider 15 from the original position is equal to that of the tip of the lens frame measuring element 37. This moving amount is calculated by the arithmetic control circuit 52 based on a signal outputted from the positional data detector head 26 of the linear scale 24.

A length from a center axis C of the measuring element shaft 35 to the tip of the lens frame measuring element 37 is known. The shape measuring apparatus for eyeglass element is configured to include the length in advance, so that the arithmetic control circuit 52 can calculate a radial coordinate $\rho i$ from the rotational center C of the rotary base 9 to the tip of the lens frame measuring element 37 by adding this length to the movement amount from the slide reference position of the slider 15 (the rotational center C of the rotary base 9) detected by the positional data detector head 26.

Additionally, a rotational angle $\theta i$ of the rotary base 9 from the rotary reference position described above can be calculated based on the number of drive pulses of the motor 6 (data on a driving state of the driver) which rotates and drives the rotating base 9. By measuring the radial coordinate $\rho i$ corresponding to the rotational angle $\theta i$ during the rotation of the rotating base 9, it is possible to obtain an inner circumferential contour shape of the groove Ym of the lens frame LF (RF) (almost the shape of the lens frame LF (RF)) in a two-dimensional polar coordinate system. The shape measuring apparatus for eyeglass element according to the present embodiment uses a set of coordinate values ($\rho i$, $\theta i$) in the polar coordinate system for the inner circumferential contour shape data of the lens frame.

In a case where the tip of the lens frame measuring element 37 traces along the groove Ym of the lens frame LF (RF) curved in the vertical direction, a vertical displacement amount due to this vertical curve is obtained as the vertical moving amount of the lens frame measuring element 37. In particular, the vertical moving amount is calculated by the arithmetic control circuit 52 based on a signal outputted from the positional data detector head 42 of the linear scale 40 when the lens frame measuring element 37 traces the groove Ym.

In the shape measuring apparatus for eyeglass element according to the present embodiment, the vertical displacement amount of the lens frame measuring element 37 from the original position, that is, a vertical position (height) is defined as a position Zi.

Therefore, the arithmetic control circuit 52 can obtain the inner circumferential contour shape data of the groove Ym of the lens frame LF (RF), that is, data on approximate contour shape of the lens frame LF (RF) as a set of three-dimensional coordinate values (coordinate values of cylindrical polar coordinates), ($\rho i$, $\theta i$, $Z i$).

Next, the structure of the lens frame measuring element 37 in the shape measuring apparatus for eyeglass element 100 will be described in detail with reference to FIG. 14.

Figure 14:
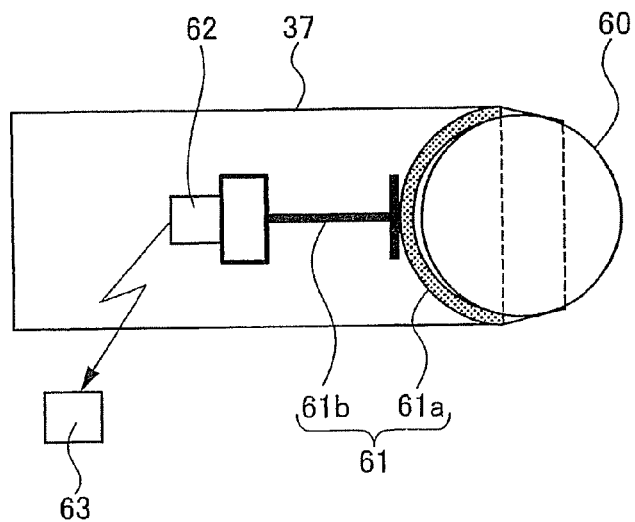
FIG. 14 is a partially enlarged view of an interior of the contact element of the shape measuring apparatus for eyeglass element according to one embodiment of the present invention.

In FIG. 14, the lens frame measuring element 37 rotatably holds a spherical member 60 and incorporates a pressure detector 61 which is in contact with the spherical member 60 to detect pressure acting thereon. The pressure detector 61 comprises a diaphragm 61a and a pressure detector portion 61b which detects movement of the diaphragm 61a as a pressure.

The lens frame measuring element 37 further includes a transmitter 62 which transmits, as pressure information, pressure onto the tip (spherical member 60) of the lens frame measuring element 37 detected by the pressure detector 61. The arithmetic control circuit 52 comprises the receiver 63 to receive the pressure information from the transmitter 62 and functions as a movement controller 64 to control the motor 18 to control the movement of the lens frame measuring element 37 in the radial direction so that the pressure indicated by the pressure information is to be a certain pressure. The pressure detector 61 converts the detected pressure into electric signals or the like and the transmitter 62 transmits it to the receiver 63 of the movement controller 64 via wire or wireless signals (infrared transmission or wireless LAN).

The transmission/reception of the pressure information between the pressure detector 61 and the movement controller 64 (arithmetic control circuit 52) can be done via a wired network with general electric wires instead of the wireless network. In such a case, the transmitter 62 and the receiver 63 can be omitted.

Next, the functions of the shape measuring apparatus for eyeglass element according to the present embodiment will be described.

For measuring the contour shape of the lens frame LF (RF), along with rotation of the rotary base 9 driven by the motor 6, the slider 15 and various components of the slider 15 are rotated together with the rotary base 9 in a horizontal plane while the tip of the lens frame measuring element 37 is slid along the groove Ym due to the movement of the slider 15 in the radial direction. Here, the lens frame measuring element 37 sliding on the groove Ym receives reaction force in a direction opposite to the rotation of the rotary base 9.

However, according to the shape measuring apparatus for eyeglass element 100 in the present embodiment, the lens frame measuring element 37 includes the rotatable spherical member 60 at the tip so that the rotation of spherical member 60 can decrease sliding resistance and reaction force.

Figure 15:
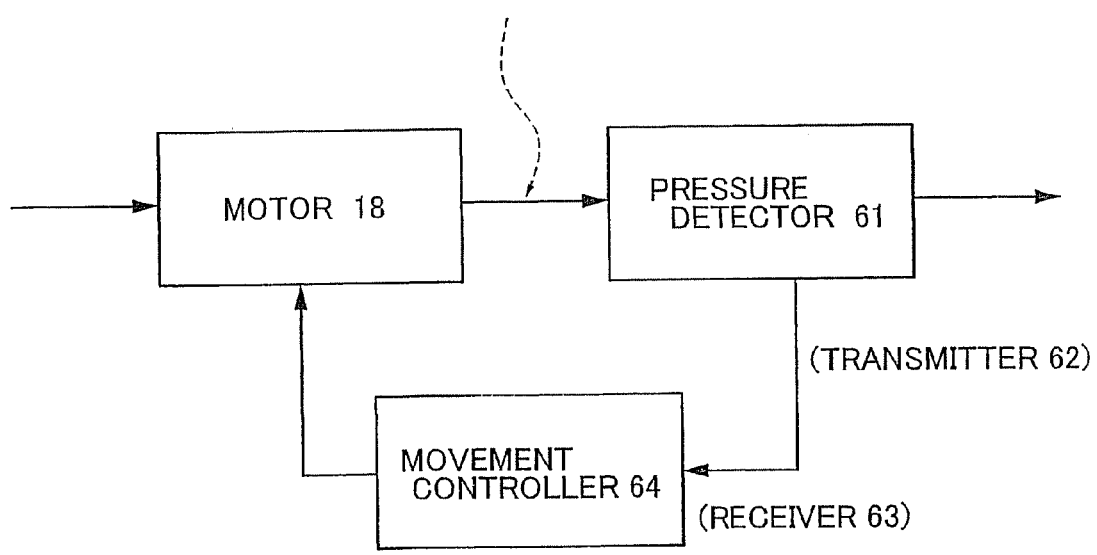
FIG. 15 shows a control mechanism by a movement controller of the shape measuring apparatus for eyeglass element according to one embodiment of the present invention.

In measuring the contour shape of the lens frame LF (RF), the spherical member 60 in contact with the groove Ym of the lens frame LF (RF) receives pressure as reaction force from the groove Ym. The pressure on the spherical member 60 is detected by the pressure detector 61 as in FIG. 15.

When the pressure information received by the receiver 63 indicates a pressure lower than a prescribed value R, which is a proper pressure to get the spherical member 60 in contact with the groove Ym, the movement controller 64 (or arithmetic control circuit 52) normally rotates the motor 18 so that the lens frame measuring element 37 moves closer to the lens frame LF (RF), to increase the pressure to the prescribed value R. In contrast, when the pressure information indicates a pressure higher than the prescribed value R, the movement controller 64 reversely rotates the motor 18 so that the lens frame measuring element 37 moves away from the lens frame LF (RF), to reduce the pressure to the prescribed value R.

As described above, the movement controller 64 controls the movement of the lens frame measuring element 37 in a direction to the eyeglass frame (radial direction) to adjust amount of pressure on the spherical member 60 from the lens frame LF (RF) to be constant.

According to the shape measuring apparatus for eyeglass element 100 in the present embodiment, it is possible to reduce the sliding resistance and reaction force between the lens frame measuring element 37 and the lens frame LF (RF) at the time of measuring the contour shape of the lens frame LF (RF) by rotating the spherical member 60 at the tip of the lens frame measuring element 37 in an opposite direction to the rotation of the rotary base 9.

In other words, owing to the rotating spherical member 60, the lens frame measuring element 37 can move smoothly to the lens frame LF (RF) with a decreased sliding resistance. Accordingly, it is possible to prevent the shaft of the lens frame measuring element 37 from bending or broken and prevent the contour shape of the lens frame LF (RF) from being deformed.

Further, the movement of the lens frame measuring element 37 can be adjusted in the radial direction so as to make the pressure on the spherical member 60 from the lens frame LF (RF) be constant. This makes it possible to prevent the lens frame measuring element 37 from coming off from the groove of the lens frame LF (RF) due to insufficient pressure to the lens frame LF (RF) at the time of the contour shape measurement.

Further, it is possible to prevent deformation of the lens frame measuring element 37 or the lens frame LF (RF) due to extraneous pressure onto the lens frame LF (RF) from the lens frame measuring element 37.

Note that in the shape measuring apparatus for eyeglass element 100 according to the present embodiment, the pressure detector 61 is configured to contact with the spherical member 60 inside the lens frame measuring element 37. However, the present invention is not limited thereto. The pressure detector 61 can be provided inside the spherical member 60.

With a shape measuring apparatus for eyeglass element including the pressure detector 61 inside the spherical member 60, the same functions and effects as those of the shape measuring apparatus for eyeglass element are attainable.

Figure 16A:
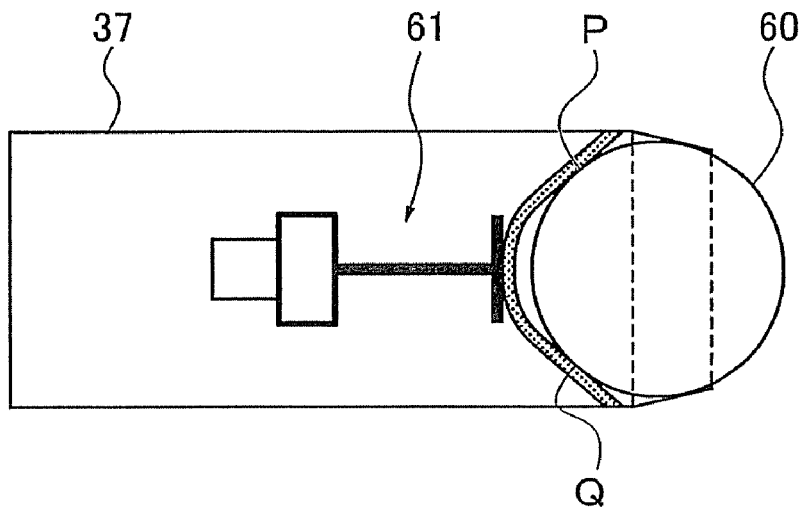
FIGS. 16A to 16C are partially enlarged views of an interior of the contact element of the shape measuring apparatus for eyeglass element according to another embodiment of the present invention.
Figure 16B:
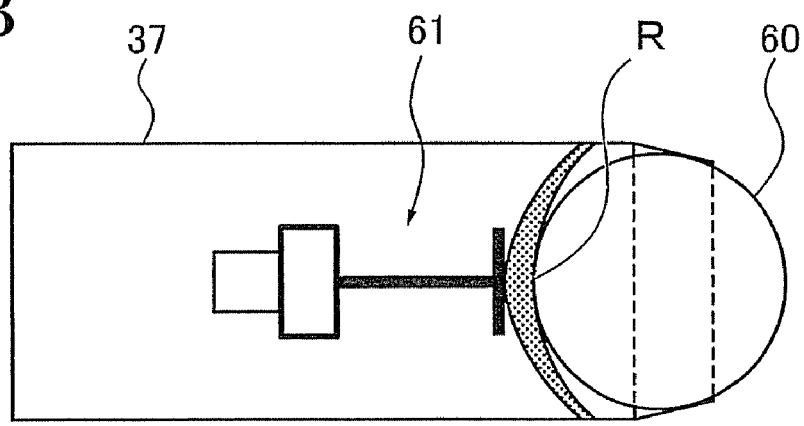
Figure 16C:
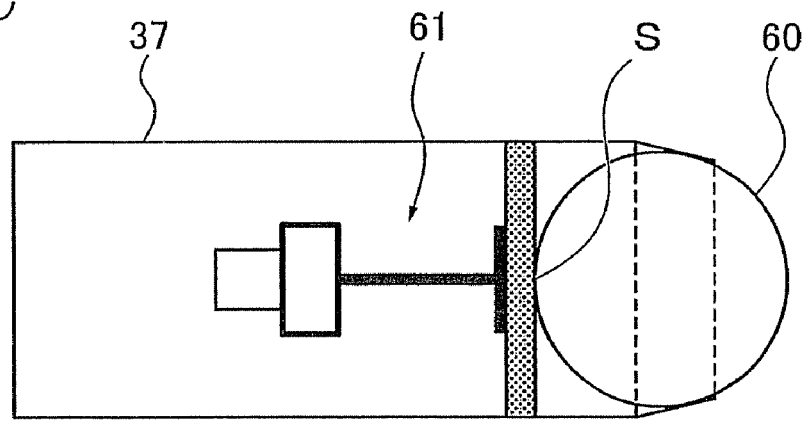

Further, the pressure detector 61 is configured to hold the spherical member 60 in FIG. 14. However, it is not limited to such a configuration. It can be configured to contact with the spherical member 60 at only two points P, Q in FIG. 16A or at only one point R. or S in FIGS. 16B, 16C as long as it can detect pressure to the spherical member 60 in the radial direction.

Note that the pressure detector 61 can be a touch sensor, a piezo element, or MEMS (Micro Electro Mechanical Systems) instead of a diaphragm. Also, using a diaphragm, a pressure sensor in which a distortion gauge is mounted on the diaphragm is applicable.

The present embodiment is configured that the lens frame measuring element 37 can be vertically displaced freely by biasing or releasing the engaging pin 44 as shown in FIG. 11. Specifically, the coil spring 48 biases the elevation position regulating lever 49 together with the pressing lever 47 downward to bias the engaging pin 44 downward, thereby regulating the elevation of the measuring element shaft 35 provided with the lens frame measuring element 37. Meanwhile, the linear actuator 50 is driven to elevate the shaft 51 and the elevated shaft 51 elevates the elevation position regulating lever 49 together with the pressing lever 47 against the biasing force of the coil spring 48. The elevation of the pressing lever 47 releases the downward restriction to the engaging pin 44 to vertically move the lens frame measuring element 37 freely. However, the regulation of vertical displacement and release of the lens frame measuring element 37 is not limited to such a configuration.

For example, the vertical displacement of the lens frame measuring element 37 can be regulated or released by a pulse motor, a pinion gear on a shaft of the pulse motor, and a rack engaging with the pinion gear as disclosed in FIGS. 4 to 6 of Japanese Unexamined Patent Application Publication No. 2002-122829.

Furthermore, the lens frame measuring element 37 can be driven in the radial direction by a combination of the motor and the above-described rack and pinion gear in replace of the motor 18 and the wire belt 20 in FIG. 7.

Second Embodiment

Next, the main features of the shape measuring apparatus for eyeglass element according to the second embodiment will be described.

The shape measuring apparatus for eyeglass element 100 according to the present embodiment is configured to include a moving amount detector 65 detecting a moving amount of the lens frame measuring element 37 per unit time based on a detect signal indicating a radius coordinate from the linear scale 24, and a movement controller 64 controlling the movement of the lens frame measuring element 37, in addition to the components of the apparatus according to the first embodiment.

The movement controller 64 controls the lens frame measuring element 37 to move towards the groove of the lens frame LF (RF) at a desirable moving speed in accordance with the moving amount of the lens frame measuring element 37 detected by the moving amount detector 65.

Further, the movement controller 64 controls the lens frame measuring element 37 to decease the moving speed when the moving speed is equal to or larger than a first predetermined value as well as to increase the moving speed when the moving speed is lower than a second predetermined value which is lower than the first predetermined value.

The first predetermined value is an upper limit of such a moving speed as not to damage the lens frame LF (RF) when the lens frame measuring element 37 contacts with it. The second predetermined value is a lower limit of such a moving speed as to overcome friction of the moving lens frame measuring element 37.

Further, the movement controller 64 controls the lens frame measuring element 37 to stop moving, upon determining that the lens frame measuring element 37 contacts with the groove of the lens frame LF (RF) when the moving amount detector 65 detects that the lens frame measuring element 37 has not moved over a predetermined length of time. Note that the predetermined length of time is a time to be a determining condition in which the lens frame measuring element 37 does not temporarily stop because of friction but it has continuously stopped because it is in contact with the groove of the lens frame.

The movement controller 64 controls the movement of the lens frame measuring element 37 by controlling supply of electric current to the motor (DC motor) 18.

Next, the operation of the shape measuring apparatus for eyeglass element 100 is described.

At start of the shape measurement, the motor 18 is set to have predetermined current values (corresponding to the first and second predetermined values).

The moving amount detector 65 detects the moving amount of the lens frame measuring element 37 per unit time (for example, 1 m/sec.) using the linear scale 24 of the lens frame measuring element 37.

The movement controller 64 decreases the current value of the motor 18 by a certain amount to decrease the moving speed of the lens frame measuring element 37, upon determining that the lens frame measuring element 37 moves too fast when the detected moving amount is larger than the first predetermined value. Also, the movement controller 64 can control the lens frame measuring element 37 to move by inertia by stopping the current supply to the motor 18.

Meanwhile, when the detected moving amount is lower than the second predetermined value, the movement controller 64 increases the moving speed of the lens frame measuring element 37 by increasing the current value of the motor 18 by a certain amount so as to prevent the lens frame measuring element 37 from stopping moving due to the friction.

The first predetermined value is a moving speed corresponding to a moving amount of 80 to 100 mm per second while the second predetermined value is a moving speed corresponding to a moving amount of 10 mm or less per second, for example.

Preferably, the moving speed of the lens frame measuring element 37 is set to one corresponding to a moving amount of about 30 to 50 mm per second, for example As described above, the movement controller 64 controls the lens frame measuring element 37 to move towards the lens frame LF (RF) at a desirable moving speed, so as to slowly engage the lens frame measuring element 37 with the circumferential edge of the lens frame LF (RF) and weaken the impact thereon.

Further, the movement controller 64 stops the movement of the lens frame measuring element 37 when the moving amount detector 65 detects that the lens frame measuring element 37 has not moved over a predetermined length of time since it is brought into contact with the circumferential edge of the lens frame LF (RF).

As described above, according to the shape measuring apparatus for eyeglass element 100 in the present embodiment, the lens frame measuring element 37 can be controlled to move at a desirable speed, that is, such a speed as not to damage the lens frame LF (RF) and as to overcome friction of the moving lens frame measuring element 37. This makes it possible to prevent the lens frame measuring element 37 from erroneously stop moving as well as to weaken the impact from the contact and prevent the breakage of the lens frame LF (RF).

Further, the lens frame measuring element 37 can be controlled to decrease the moving speed when the moving speed is equal to or over the first predetermined value. Thereby, it is possible to prevent the lens frame measuring element 37 from hitting and bouncing off from the circumferential edge of the lens frame LF (RF).

Also, the lens frame measuring element 37 can be controlled to increase the moving speed when the moving speed is lower than the second predetermined value lower than the first predetermined value. Thereby, it is possible to prevent the lens frame measuring element 37 from stopping moving halfway due to the friction.

Moreover, the lens frame measuring element 37 can be controlled to stop moving when it is determined to be in contact with the groove of the lens frame LF (RF) from the moving amount detector 65's detection that the lens frame measuring element 37 has not moved over a predetermined length of time. Thereby, it is possible to prevent the lens frame measuring element 37 from erroneously stopping moving before getting in contact with the groove of the lens frame LF (RF).

Further, the movement of the lens frame measuring element 37 can be controlled by controlling the current supply to the motor (DC motor) 18. Accordingly, it is possible to control the movement of the lens frame measuring element 37 by a servo control to the DC motor without a complex device necessary for a pulse motor, for example.

The present embodiments have described the measurement of the shape of the lens frame (eyeglass frame) LF (RF). However, the shape measuring apparatus and method for eyeglass element is not limited thereto. The present invention is applicable to measuring of shapes of a template, pattern, a demo lens and the like in addition to the lens frame, for example.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A shape measuring apparatus for eyeglass element, comprising:
   a holder which holds an eyeglass element;
   a measuring element which traces a shape of the eyeglass element;
   a driver which drives the measuring element;
   a position detector which detects a position of the measuring element;
   an arithmetic controller which acquires and processes positional data on the measuring element detected by the position detector, and controls the driver to slide the measuring element along a contour of the eyeglass element while the holder is holding the eyeglass element;

a moving amount detector which detects a moving amount of the measuring element per unit time when the measuring element moves towards the eyeglass element; and a movement controller which controls the measuring element to move at a desirable moving speed, the moving speed being the moving amount per unit time detected by the moving amount detector, wherein the shape measuring apparatus for eyeglass element measures a contour shape of the eyeglass element by allowing the measuring element to trace a three-dimensional shape of the eyeglass element and acquiring the three-dimensional shape based on data on a drive state of the driver and positional data on the measuring element.

2. The shape measuring apparatus for eyeglass element according to claim 1, wherein the movement controller controls the measuring element to decrease the moving speed when the moving speed is equal to or larger than a first predetermined value.

3. The shape measuring apparatus for eyeglass element according to claim 2, wherein the movement controller controls the measuring element to increase the moving speed when the moving speed is lower than a second predetermined value which is lower than the first predetermined value.

4. The shape measuring apparatus for eyeglass element according to claim 1, wherein when the moving amount detector detects that the measuring element has not moved over a predetermined length of time, the movement controller determines that the measuring element contacts with the eyeglass element and controls the measuring element to stop moving.

5. The shape measuring apparatus for eyeglass element according to claim 1, further comprising a DC motor which moves the measuring element, wherein the movement controller controls the moving speed of the measuring element by controlling supply of an electric current to the DC motor.

6. A shape measuring apparatus for eyeglass element, comprising:

a holder which holds an eyeglass frame;

a measuring element which traces grooves of two lens frames constituting the eyeglass frame;

a driver which drives the measuring element;

a position detector which detects a position of the measuring element;

an arithmetic controller which acquires and processes positional data on the measuring element detected by the position detector, and controls the driver to slide the measuring element in the groove of each lens frame while the holder is holding the eyeglass frame;

a moving amount detector which detects a moving amount of the measuring element per unit time when the measuring element moves towards a circumferential edge of the groove of each lens frame; and a movement controller which controls the measuring element to move at a desirable moving speed, the moving speed being the moving amount per unit time detected by the moving amount detector, wherein the shape measuring apparatus for eyeglass element measures an inner circumferential contour shape of each lens frame by allowing the measuring element to trace a three-dimensional shape of each lens frame and acquiring the three-dimensional shape based on data on a drive state of the driver and positional data on the measuring element.

7. A shape measuring method for eyeglass element, comprising the steps of:

detecting a moving amount of a measuring element per unit time while the measuring element is moving towards an eyeglass element;

controlling the measuring element to move at a desirable moving speed, the moving speed being the moving amount detected; and measuring the eyeglass element with the measuring element after the measuring element contacts the eyeglass element.

8. The shape measuring method for eyeglass element according to claim 7, further comprising the step of controlling the measuring element to decrease the moving speed when the moving speed is equal to or larger than a first predetermined value.

9. The shape measuring method for eyeglass element according to claim 8, further comprising the step of controlling the measuring element to increase the moving speed when the moving speed is lower than a second predetermined value which is lower than the first predetermined value.

10. The shape measuring method for eyeglass element according to claim 9, further comprising the step of determining that the measuring element contacts with the eyeglass element when the measuring element has not moved over a predetermined length of time and controlling the measuring element to stop moving.

11. The shape measuring method for eyeglass element according to claim 7, further comprising the step of controlling the movement of the measuring element by controlling supply of an electric current to a DC motor which moves the measuring element.

12. The shape measuring method for eyeglass element according to claim 7, wherein the step of measuring the eyeglass element with the measuring element comprises moving the measuring element along a contour of the eyeglass element.

* * * * *